Patented Oct. 16, 1923.

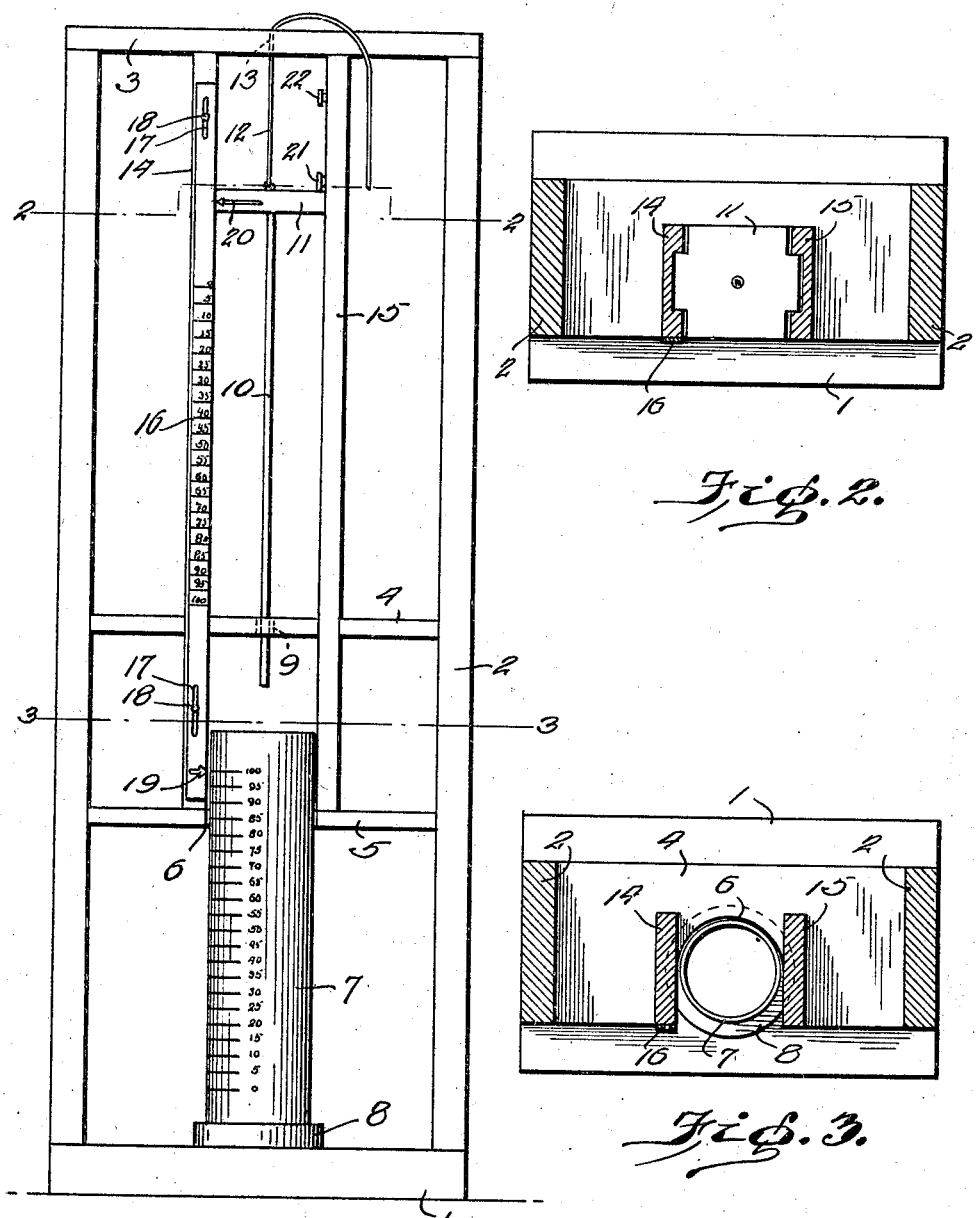

1,470,806

UNITED STATES PATENT OFFICE.

ARTHUR D. BURKE, OF STILLWATER, OKLAHOMA.

GELATIN TESTER.

Application filed November 29, 1921. Serial No. 518,503.

*To all whom it may concern:*

Be it known that I, ARTHUR D. BURKE, a citizen of the United States, residing at Stillwater, in the county of Payne and State of Oklahoma, have invented certain new and useful Improvements in Gelatin Testers, of which the following is a specification.

This invention relates to gelatin testers, and has particular reference to a device of this character which will easily and quickly determine the solidified state of gelatin or other binders used extensively in the manufacture of ice cream.

Brick and other fancy ice creams are usually not consumed for some time after they are made, and are therefore unduly exposed to the danger of softening, or melting. To overcome this, manufacturers have been in the habit of using various materials for binders, chief among which is gelatin.

For use in ice cream gelatin is prepared in one of the following ways: first, it may be added to water or milk and dissolved by heating to 145° F. or 180° F. and then added direct to the ice cream mix, or: second, it may be incorporated into the mix directly along with the sugar and other constituents which are all subjected to the heat of pasteurization and thus readily pass into solution.

When the ice cream mix has been made and cooled down the small particles of gelatin distributed throughout have the power of solidifying and absorbing moisture which is collected from the surrounding ice cream and thus not only prevent the formation of ice crystals but give the ice cream great resistance to melting and better "standing up qualities".

Gelatin is made of various strengths, some samples having greater solidification powers and stronger binding capacity than other samples. Likewise, tests have been made which have determined that those samples of gelatin which solidify the hardest after being dissolved in water and allowed to jell are those gelatins most adaptable, as a rule, to use in ice-cream making.

It has heretofore been difficult to determine which gelatins are most adaptable for use in ice cream making, as no quick, accurate, and simple method has been provided for testing the solidification powers of different grades of gelatins to determine which grade is most satisfactory for use.

It is, therefore, the primary object of this invention, to provide a device for testing the solidification qualities of gelatins in order to ascertain which gelatins are most adaptable for use in ice cream making.

Other objects and advantages of this invention will be apparent in the course of the following description, taken in conjunction with the accompanying drawings, and the particular features of novelty will be pointed out in the appended claims.

In the drawings:—

Figure 1 is a front elevation of the device.

Fig. 2 is a view on the line 2—2, Fig. 1; and

Fig. 3 is a view on the line 3—3, Fig. 1.

Referring more particularly to the drawings, the device comprises a frame, having a base 1, uprights, or standards 2, and a top 3.

Positioned intermediate the base 1 and top 3, and extending between uprights 2, are cross pieces or reinforcing elements 4 and 5.

The cross piece 5 is provided with a semi-circular opening, which receives therein, the upper end of a cylindrical vessel 7, the lower end of which is removably seated within a retaining element 8, secured to the base 1. The vessel 7 is provided with a series of graduations from 0 to 100 c. c. and is of a type commonly known in the art.

The cross piece 4 is provided with a relatively small opening 9, which slidably receives a plunger 10, depending from a sliding weight 11, which latter may be elevated by means of a flexible cord or the like 12, which extends through an opening 13 in the top 3.

The weight 11, as more clearly shown in Fig. 2, is slidable in channel or guide bars 14 and 15, extending between the top 3 and the cross piece 5.

The scale bar 16 is secured to channel bar 14, and is adjustable vertically thereon by means of slots 17 at each end thereof, clamping screws 18 being employed to secure the scale bar in its adjusted position.

The scale bar 16 is provided with a series of graduations from 0 to 100 per cent, the length of the scale on scale bar 16, corresponding to the length of the graduations on the vessel 7, and near its end said scale is provided with an indicator 19.

The weight 11, above mentioned, is provided with an indicator 20, which points toward the scale 16.

The channel bar 15 is provided with set screws 21 and 22, which are removably secured thereto, and serve as stops to limit the elevation of the weight 11, it being obvious that should it be desired to elevate the weight to the stop 22, the stop 21 is removed.

For limiting the downward movement of the weight 11, the portion of cross piece 4, between channel bars 14 and 15 will serve as a stop.

In use, the graduate 7 will be filled to the 100 c.c. mark with a solution of gelatin in a solidified state, which gelatin may be a sample of a larger quantity.

The scale 16 is then adjusted, placing the indicator 19 opposite the 100 c.c. mark on the graduate. It is apparent that once the scale 16 has been adjusted so that the indicator 19 is opposite the 100 c.c. mark on the graduate, the position of the scale 16 will not have to be varied unless a graduate of different size is used.

The set screw or stop 21 is positioned above the zero mark on scale 16, as clearly shown in Figure 1, and for accurate results, it has been found necessary that this distance shall be equal to the distance between the lower end of the plunger 10 and the height of the gelatin in vessel 7, which, as before stated, is 100 c.c., when said plunger is elevated so that the weight 11 contacts with said screw 21. From this, it will be obvious that if screw 21 be removed and the weight 11 raised to contact with screw 22, the distance between the end of said plunger and the 100 c.c. graduation on the vessel should correspond to the distance between the screw 22 and the zero mark on the scale 16.

The weight 11 is raised by means of the flexible element 12 until it contacts with either of the stops 21 or 22 as desired, when the flexible element may then be released thus permitting the weight to drop, the plunger depending therefrom being forced into the gelatin in graduate 7. The depth that the plunger pierces the gelatin is indicated upon the scale on bar 16, and the operator of the device can ascertain at a glance whether the gelatin possesses the necessary qualities of solidification to be suitable for use in ice-cream making.

In the event that the gelatin does not possess the requisite solidification qualities to offer sufficient resistance to the plunger 10, the weight 11 will be stopped in its descent by that portion of cross piece 4, lying between uprights 14 and 15.

From the above description, it is obvious that an operator skilled in the art, will be able to judge or test the comparative solidification qualities of various grades of gelatins, as indicated on the scale bar 16.

It is believed that the operation of the device will be apparent from the above description when taken in conjunction with the accompanying drawings, but I desire it understood that various changes in the form and proportions of the device may be made within the scope of the appended claims, without departing from the spirit of the invention.

What I claim is:

1. In a device for testing gelatin and the like, in combination, a frame, a graduated gelatin container mounted therein and removable therefrom, a plunger mounted above said container and adapted when released from a predetermined raised position to fall freely within certain limits, an adjustable scale bar mounted on said frame and cooperating with a pointer carried by said plunger for indicating the degree of penetration of said plunger in said gelatin when dropped from the raised position.

2. In a device for testing the degree of solidification of gelatin and the like, in combination, a graduated gelatin container, a scale bar mounted above said container and similarly graduated, a manually operable plunger adapted for vertical movement into said container, means for limiting the upward movement of said plunger, said means being so positioned that the distance between said means and the uppermost graduation of the scale bar is substantially equal to the distance between the lower end of said plunger and the level of the gelatin in said container, whereby, when the plunger is dropped from the predetermined upper limit the graduations on the scale bar indicate the depth to which the plunger has penetrated the gelatin.

In testimony whereof I affix my signature.

ARTHUR D. BURKE.